United States Patent [19]

Kunkle

[11] 4,016,756
[45] Apr. 12, 1977

[54] NIP LOAD SENSING DEVICE
[75] Inventor: Donald E. Kunkle, Beloit, Wis.
[73] Assignee: Beloit Corporation, Beloit, Wis.
[22] Filed: June 8, 1972
[21] Appl. No.: 260,806
[52] U.S. Cl. .............................. 73/141 A; 33/182
[51] Int. Cl.² .......................................... G01L 5/16
[58] Field of Search ................. 73/141 A; 33/182
[56] References Cited
UNITED STATES PATENTS

| 2,162,425 | 6/1939 | Faught | 33/182 |
| 3,009,056 | 11/1961 | Bone et al. | 73/88.5 R |
| 3,418,850 | 12/1968 | Goddin | 73/141 A |
| 3,688,571 | 9/1972 | Atkins et al. | 73/144 |

Primary Examiner—James J. Gill
Attorney, Agent, or Firm—Hill, Gross, Simpson, Van Santen, Steadman, Chiara & Simpson

[57] ABSTRACT

A mechanism and method for measuring the nip load between opposed pressure rolls comprising an elongate thin load sensing bar having a length to be coextensive with the nip and having a plurality of spaced sensing load cells embedded in the bar at spaced locations to be centered in the nip and having electrical leads extending along the bar to be connected to a selector switch and an indicator means to measure the electrical characteristic of the load cells at different total loads to determine the uniformity or nonuniformity of load at the different locations in the nip.

7 Claims, 4 Drawing Figures

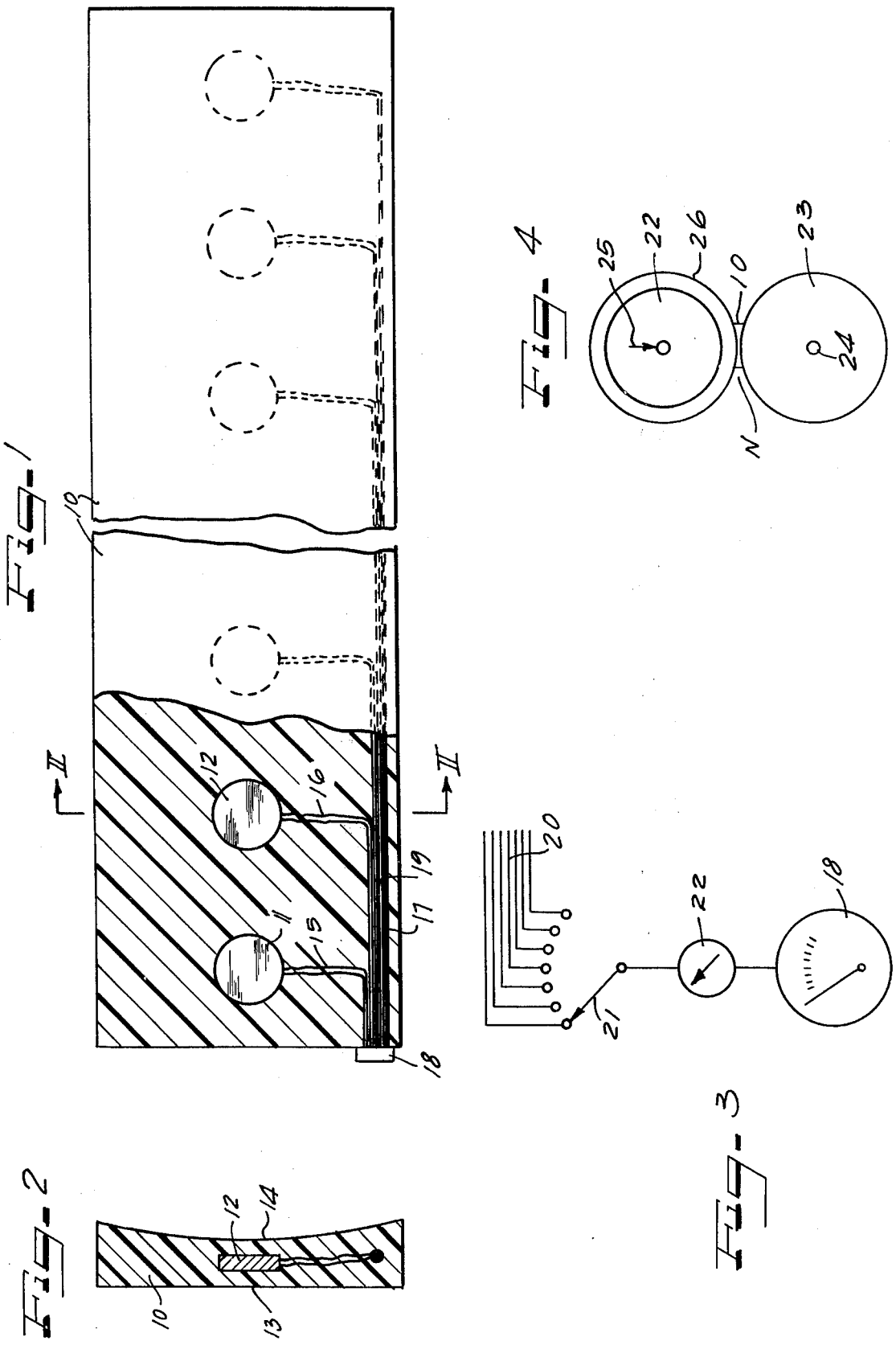

NIP LOAD SENSING DEVICE

BACKGROUND OF THE INVENTION

The invention relates to improvements in a structure and method for quickly and simply measuring the load in a nip between two opposed rolls at different locations along the nip with different overall loads on the rolls. More particularly, the invention embodies positioning a thin bar in the nip between rolls with the bar providing an electrical read-out selectively indicating the load in the nip at different locations along the nip so that the operational factors in the nip can be quickly and easily tested.

While the invention is acceptable to uses in various types of machines, it is particularly well adapted to use in a paper making machine for measuring the nip load between rolls such as are used in the press section or calender or other locations in the machine, and the invention will be primarily described as used in that environment.

In a paper making machine, the pressures along the nip are very important because they will determine the characteristic of the paper web being produced from the machine. In the press section, for example, the pressure along the nip will determine the amount of water extracted from the traveling web and nonuniformity of pressures can result in nonuniformity of extraction and a consequent nonuniform web. Where this situation occurs, correction factors have to be provided further down the machine to compensate for this nonuniformity. Also, in calendering uniformity along the length of the nip is important if the web is to be uniformly calendered. It is also important to detect the pressures along the nip because in certain circumstances, controlled variable pressures are needed to provide correctional treatment to a web which has been produced nonuniformly in the fourdrinier section and has a nonuniform basis weight or moisture content. This situation is true for paper machines of all widths, although with very wide machines having widths in excess of 30 feet, the situation becomes more important. The practices for testing nip loads have followed various procedures, and a common method has been to place carbon paper in the nip at different locations, but this provides a relatively crude reading of nip pressure.

In many of the nips in paper making machines, the rolls are covered with composition materials such as those formed of an epoxy resin with a polyester reinforcing. Covering materials are sold under the tradenames of Ventex and Beltex, and these materials are very hard in some circumstances. With a very hard nip, the nip width becomes more narrow, and the distribution of pressure along the nip must be kept very even for satisfactory results. A hard nip is very sensitive to any error in the crown match between the rolls.

Accordingly, it is an object of the present invention to provide an improved mechanism and method for testing the load in the nip between opposing rolls at selective locations along the nip and at different overall nip loads more easily, simply and accurately than heretofore possible.

Another object of the invention is to provide a nip load sensing device which can be placed in a nip prior to operation and will provide a visual read-out of the load in the nip at different locations along the nip length.

A feature of the invention is the provision of a thin elongate bar preferably formed of a material the same as the cover of a roll forming one of the pressure rolls, with the bar having a plurality of sensing load cells cast therein at frequent spaced locations axially along the bar so as to be centered in the nip load with the load cells testing the stress on the bar and providing an electrical output indicative of the load at that location.

Other advantages and features will become more apparent as will equivalent structures which are intended to be covered hereby, in the teachings of the principles of the invention in connection with the disclosure of the preferred embodiment thereof in the specification, claims and drawings, in which:

DESCRIPTION OF THE DRAWINGS

FIG. 1 is a top plan view shown in schematic form of a load cell bar constructed in accordance with the principles of the present invention;

FIG. 2 is a vertical sectional view taken substantially along line II—II of FIG. 1;

FIG. 3 is an electrical diagram showing the arrangement for read-out mechanism; and FIG. 4 is a schematic end elevational view illustrating the operation of the mechanism.

DESCRIPTION OF THE PREFERRED EMBODIMENTS

As illustrated in FIGS. 1 and 2, an elongate thin relatively flat bar 10 is provided of a length substantially the length of the rolls which form a pressure nip therebetween so that the bar will be coextensive with the nip. The position of use of the bar is illustrated in FIG. 4 with the bar placed in the nip N between opposed press rolls 22 and 23.

The bars are relatively thin, on the order of ¼ to ½ inch thick. As illustrated, the upper surface 13 of the bar is flat and the lower surface 14 is concave with the radius of the arc of the surface 14 being no smaller than the radius of the roll, so that the pressure in the nip is felt at the center of the bar.

Embedded in the bar at the center thereof so as to lie directly in the center of the nip are a plurality of load cells 12. These load cells are positioned at axially spaced locations as shown by the load cells 11 and 12 in FIG. 1.

The bar is preferably formed of a material the same as the covering of the roll, although various materials may be employed which are suitable for integrally supporting the load cells. The load cells are preferably cast into the bar so as to accurately reflect the stress on the material on the bar. By becoming an integral part thereof, the compressive stress in the bar is accurately reflected by the load cells.

The load cells are electrical devices which have an electrical characteristic that changes as a function of load. Various types are commercially available and generally they operate on a strain gauge principle wherein the electrical resistance changes as a linear, or other known function of stress.

Each of the load cells are provided with electrical leads as shown at 15 and 16 for the cells 11 and 12. The leads extend transversely of the nip to be out of the pressure zone of the nip and are carried in an axially extending passage 17 so that all of the leads 19 extend out to the end of the bar 10 to a meter 18. The meter 18 is provided with a selector switch, shown at 21 in FIG. 3, which permits selectively connecting the meter to any one of the leads 20 leading to the load cells.

The load cells initially have a zero point which may change after they are cast in the bar. To balance the cells so that they give a uniform no load reading, a compensator, indicated as a temperature compensation control 22 is provided. This may have a plurality of positions so as to be joined in tandem with the switch 21, and for each load cell a fixed correction resistance may be provided in the circuit. This may be chosen after the bar is manufactured. Also, in some circumstances a temperature differential exists along the length of the bar which will change the zero reading of the different load cells. To obtain a uniform reference point, the temperature compensating mechanism 22 may be changed to provide a uniform zero load point, so that when the nip load is tested, an accurate comparison can be made along the length of the nip.

In operation, as shown in FIG. 4, the bar 10 is placed in the nip N and the rolls 22 and 23 are brought together. As illustrated, the lower roll 23 is mounted on a fixed rotational axis, and the upper roll has a loading means 25 for applying a controlled variable nip pressure. The roll is shown with a composition covering 26. The nip loading means 25 may be hydraulic piston and cylinder arrangement at each end of the roll. In certain nip installations, the roll may be the type having a deflection control so that the operator may wish to regulate the deflection control mechanism relative to the total load on the nip. The present mechanism will enable the operator to load the nip and vary the deflection control apparatus to obtain the desired pressure along the nip by merely reading the load on the nip at different locations by flipping the selector switch 21 to read the different locations on the meter 18.

It is preferred that the bar be maintained as thin as possible since the rolls will perform more accurately if they are maintained closer to the position that they will be during operation. In other words when the rolls are used in a paper making machine, their nip separation is a few thousandths of an inch during operation, and their nip load will perform substantially the same if they are merely separated ¼ inch which represents the thickness of the load sensing bar.

In operation, to sense the nip load prior to operating the machine, the rolls are separated a small distance, and the bar is slipped into the center of the nip, and the nip is closed and loaded. Readings are immediately taken and adjustments made correspondingly. If the machine is to run over a series of nip loads, the nip is loaded to the various operating loads expected, and readings are taken so that the operator will know the load at the locations along the nip for the different overall loads.

Thus, it will be seen that I have provided an improved nip load sensing device which very accurately provides indications of conditions in the nip between a pair of pressure rolls. The device is easy to operate and relatively inexpensive to construct. In a paper mill such a device will operate to prove read-outs of different nips in a single machine and a bar can be provided for each of the machines being of a length equal to the machine width.

I claim as my invention:

1. A mechanism for measuring nip load between opposed pressure rolls comprising in combination, an elongate thin straight load sensing bar having a length to be coextensive with a nip to be tested, said bar being of substantially uniform thickness along its length, a plurality of spaced load sensing cells embedded in said bar at spaced locations aligned with each other in a straight line so as to be centered in the nip with the bar centered between the rolls forming the nip and having an electrical characteristic which is a function of the stress on the bar across the nip, and electrical leads connected to each of the load sensing cells for connection to an indicator means for indicating the change in said electrical characteristic so that the nip load can be determined at each said locations along the nip at a predetermined overall force between rolls.

2. A mechanism for measuring nip load between opposed pressure rolls constructed in accordance with claim 1 and including an electrical visual indicator means providing an output reading of the electrical characteristics of individual sensing cells.

3. A mechanism for measuring nip load between opposed pressure rolls constructed in accordance with claim 2 and including a multiposition selector switch connected to said leads and connected to said indicator for selectively indicating the electrical characteristic in the load at different positions along the nip.

4. A mechanism for measuring nip load between opposed pressure rolls constructed in accordance with claim 1 and including individual electrical leads connected to each of said cells and leading axially to the end of said bar with said indicator means positioned at the end of the bar.

5. A mechanism for measuring nip load between opposed pressure rolls constructed in accordance with claim 1 wherein said sensing cells are cast into said load sensing bar so as to be integral therewith.

6. A mechanism for measuring nip load between opposed pressure rolls constructed in accordance with claim 1 wherein said bar is formed of an epoxy resin with a polyester reinforcing material.

7. A mechanism for measuring nip load between opposed pressure rolls constructed in accordance with claim 1 wherein said electrical leads extends transversely of the nip to one side of said bar and then extend axially along the bar to the end for connection to the indicator means.

* * * * *